United States Patent
Parker

(10) Patent No.: US 7,574,803 B2
(45) Date of Patent: Aug. 18, 2009

(54) UNDERCUT SAW

(76) Inventor: Gregory G. Parker, 11942 Old St. Charles Rd., Bridgeton, MO (US) 63044

( * ) Notice: Subject to any disclaimer, the term of this patent is extended or adjusted under 35 U.S.C. 154(b) by 8 days.

(21) Appl. No.: 11/345,062

(22) Filed: Feb. 1, 2006

(65) Prior Publication Data

US 2007/0175050 A1 Aug. 2, 2007

(51) Int. Cl.
*B27B 19/02* (2006.01)
*B23D 49/11* (2006.01)

(52) U.S. Cl. .............. 30/122; 30/375; 30/392; 83/699.21; 83/750

(58) Field of Classification Search ............... 30/122, 30/514, 392–394, 277.4, 337, 344; D8/70; 83/750, 699.21
See application file for complete search history.

(56) References Cited

U.S. PATENT DOCUMENTS

| | | | | |
|---|---|---|---|---|
| 2,954,808 A | * | 10/1960 | Sweeney et al. | 30/375 |
| 4,553,306 A | * | 11/1985 | Mineck | 29/401.1 |
| 5,809,657 A | * | 9/1998 | Mortensen | 30/392 |
| 6,342,001 B1 | * | 1/2002 | Larson | 451/356 |
| 6,871,405 B2 | * | 3/2005 | Reale et al. | 30/392 |
| 2002/0144411 A1 | * | 10/2002 | Brooks | 30/392 |
| 2004/0221461 A1 | * | 11/2004 | Knisley et al. | 30/392 |
| 2005/0210686 A1 | * | 9/2005 | Ritter et al. | 30/392 |
| 2006/0137498 A1 | * | 6/2006 | Bowling | 83/13 |
| 2007/0074406 A1 | * | 4/2007 | Magyla | 30/392 |
| 2007/0163415 A1 | * | 7/2007 | Ritter et al. | 83/698.11 |

* cited by examiner

*Primary Examiner*—Boyer D. Ashley
*Assistant Examiner*—Laura M. Lee
(74) *Attorney, Agent, or Firm*—Polster, Lieder, Woodruff & Lucchesi, LC

(57) ABSTRACT

A saw for undercutting door jambs or trim including a saw blade attached to a flange having a first portion attached to the saw blade, a second, offset portion that extends away from a plane defined by the first portion and a third portion that extends away from the second portion in a plane generally parallel with the first portion. The third portion of the flange has a saw attachment portion for use with a general purpose saw.

5 Claims, 1 Drawing Sheet

UNDERCUT SAW

FIELD OF THE INVENTION

The present invention relates to saws. More specifically, the invention relates to an improved undercut saw blade for a power saw.

BACKGROUND OF THE INVENTION

When installing solid material flooring, such as tile or hardwood, in an existing home, it is common that door jambs and door trim will have to be cut in order to insert the solid material flooring under the door jamb. This is particularly true when the home previously had carpeting installed. This is due to the fact that solid material flooring will show an unsightly gap if the flooring is butted against a jamb or trim that extends all of the way down to the subflooring. However, installations having carpeted flooring typically have the jamb and trim installed all the way down to the subflooring. Therefore, in order to install solid material flooring in a home that has previously had carpeting installed, it is necessary to cut the jamb and/or trim off at a height above the subflooring roughly equal to the thickness of the solid material flooring.

In the past, the job of cutting trim and jambs has been done by hand because common power equipment will not cut parallel to the subflooring at distances very close to the floor, typically because the size of the motor for common power saws is too large. Sawing jambs and trim in place by hand is time consuming and more physically demanding than would be cutting such jambs and trim with power equipment. Removing the jambs and trim would be even more time consuming and require more physical labor and precise workmanship. Therefore, there is a need for a saw that allows jambs and trim to be cut in place for solid material flooring with power equipment.

SUMMARY OF THE INVENTION

The presenting invention comprises a saw for undercutting door jambs or trim. A saw blade is attached to a flange having a first portion attached to the saw blade, a second, offset portion that extends away from a plane defined by the first portion and a third portion that extends away from the second portion in a plane generally parallel with the first portion. The third portion of the flange has a saw attachment portion for use with a general purpose saw motor.

DESCRIPTION OF THE PREFERRED EMBODIMENT

Figure 1:
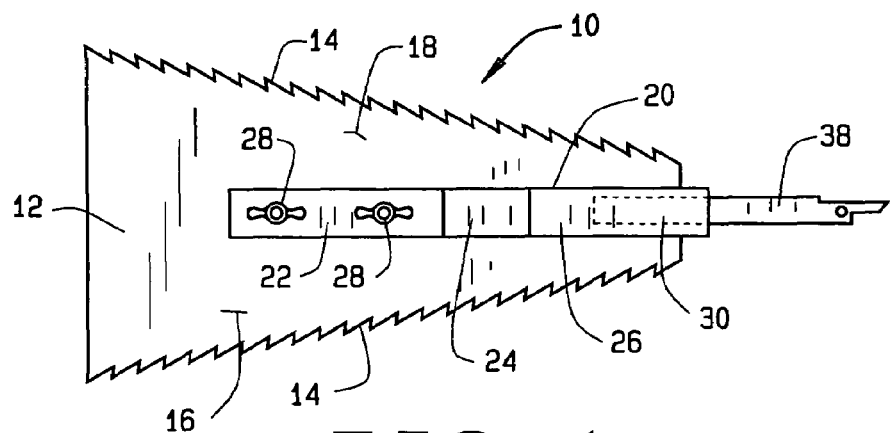
FIG. 1 is a top view of a saw according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The preferred embodiment of the present invention comprises a saw for a general purpose saw motor that allows door jambs and trim to be easily cut parallel and near the subflooring to allow solid material flooring to be placed under said jambs or trim without removing the jambs or trim from a wall.

Figure 2:
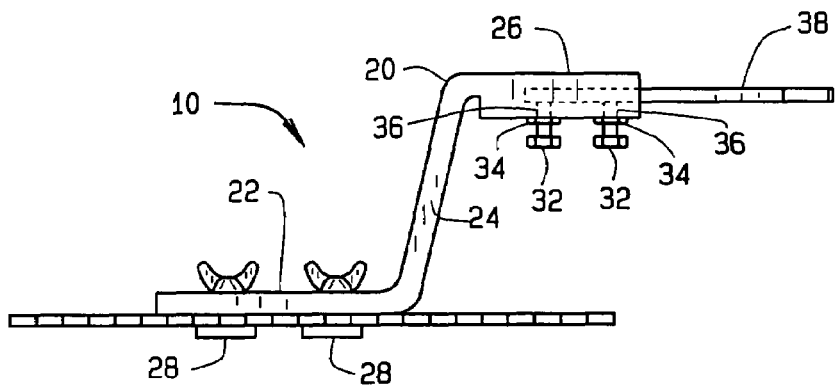
FIG. 2 is a side view of a saw according to an embodiment of the present invention.
Figure 3:
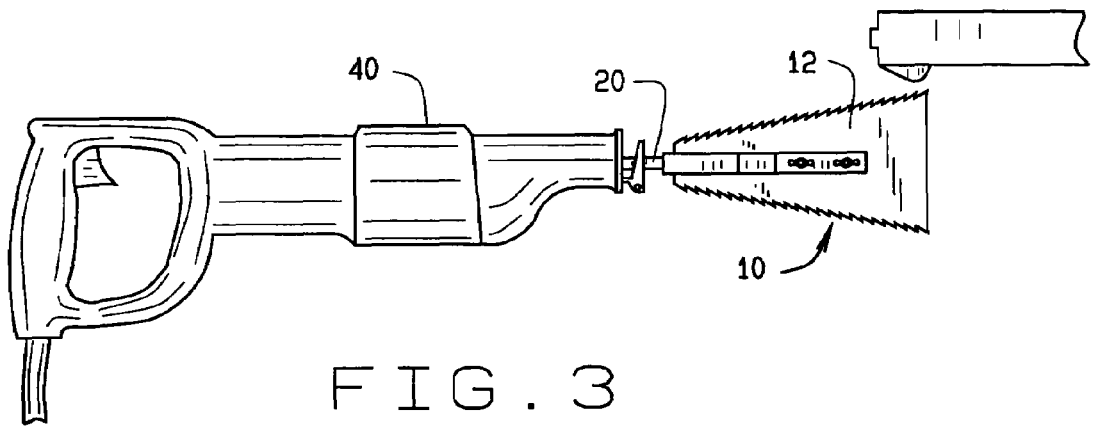
FIG. 3 is a side view of a saw attached to a general purpose saw motor according to an embodiment of the present invention.

Referring to FIGS. 1 and 2, there is shown a saw 10 according to a preferred embodiment of the present invention. The saw 10 comprises a saw blade 12 having a plurality of teeth 14 on a first side 16 and a second side 18 thereof. The saw blade 12 is attached to an offset attachment flange 20. The flange 20 comprises a first portion 22 attached to the saw blade, a second, offset portion 24 that extends away from a plane defined by the first portion 22 and a third portion 26 that extends away from the second portion 24 in a plane generally parallel with the first portion 22. The second portion 24 most preferably extends from the first and third portions 22 and 26 at about a ninety degree angle.

The first portion 22 of the flange 20 defines two bores which align with two bores in the saw blade 12. Through the bores, fasteners 28 attach the first portion 22 of the flange 20 to the saw blade 12. The fasters 28 are preferably cap screws with wing nuts attached thereto for easy replacement of the saw blade 12 when it dulls. The cap screws are preferably low profile cap screws having short heads so that they will not scratch or scrape on the subflooring when the saw is used.

The third portion 26 of the flange 20 preferably defines a pocket 30. The third portion 26 further comprises two fasteners 32, preferably cap screws, threaded into hex nuts 34 which have been welded to the third portion 26. The fasteners 32 thread through the hex nuts 34 and through bores 36 which align with the hex nuts 34 and allow entry of the fasteners 32 into the pocket 30. Alternatively, the hex nuts 34 may be eliminated and the bores 36 threaded to receive the cap screws 32. A general purpose saw blade 38 is inserted into the pocket 30 and clamped into place by tightening the fasteners 32 against the general purpose saw blade 38.

The clamping attachment of the general purpose saw blade 38 of the general purpose saw 40 to the flange 20 shall be referred to herein as a saw attachment portion.

In this manner, the general purpose saw blade 38 may be chucked into a general purpose saw 40, most preferably a prior art reciprocating saw. By operating the saw 40, the saw blade 12 will reciprocate back and forth and as a result of the offset flange 20 can be used to get very close to the floor to undercut door jambs and trim.

While the specific embodiments have been illustrated and described, numerous modifications come to mind without significantly departing from the spirit of the invention. The scope of protection is only limited by the scope of the accompanying claims.

I claim:

1. A saw for undercutting door jambs or trim comprising:
   a general purpose saw blade attached to a general purpose saw;
   an undercutting saw blade attached to a flange, the flange having a first portion attached to the undercutting saw blade, a second, offset portion that extends substantially orthogonally away from the first portion and a third portion that extends substantially orthogonally away from the second portion in a direction substantially opposite that of the first portion and in a plane generally parallel with the first portion, the third portion of the flange having a saw attachment portion comprising an internal blade pocket structured to removably receive a portion of the general purpose saw blade chucked into the general purpose saw, and fasteners which are used to attach the flange to the general purpose saw blade disposed within the internal blade pocket by a clamping action against a surface of the general purpose saw blade and not extending through bores or apertures in the general purpose saw blade such that when the flange is to be removed from the general purpose saw blade the fasteners are loosened and not removed entirely, the fasteners further being threaded through a wall of the flange and threadingly extending into internal blade pocket to accomplish the clamping action.

2. The saw of claim 1 wherein the first portion of the flange is parallel to the undercutting saw blade and the undercutting saw blade is removably attached to the first portion of the flange.

3. The saw of claim 2 wherein the undercutting saw blade is removably attached with fasteners.

4. The saw of claim 3 wherein the fasteners are wing nuts and cap screws.

5. The saw of claim 1 wherein the undercutting saw blade is trapezoidal.

\* \* \* \* \*

UNITED STATES PATENT AND TRADEMARK OFFICE
CERTIFICATE OF CORRECTION

PATENT NO. : 7,574,803 B2
APPLICATION NO. : 11/345062
DATED : August 18, 2009
INVENTOR(S) : Gregory G. Parker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 50 days.

Signed and Sealed this

Seventh Day of September, 2010

David J. Kappos
*Director of the United States Patent and Trademark Office*